United States Patent
Acharya et al.

(10) Patent No.: US 12,033,001 B2
(45) Date of Patent: Jul. 9, 2024

(54) OPTIMIZING MACHINE LEARNING AS-A-SERVICE PERFORMANCE FOR CELLULAR COMMUNICATION SYSTEMS

(71) Applicant: Hitachi, Ltd., Tokyo (JP)

(72) Inventors: Joydeep Acharya, Milpitas, CA (US); Sudhanshu Gaur, Cupertino, CA (US)

(73) Assignee: HITACHI, LTD., Tokyo (JP)

(*) Notice: Subject to any disclaimer, the term of this patent is extended or adjusted under 35 U.S.C. 154(b) by 495 days.

(21) Appl. No.: 17/465,630

(22) Filed: Sep. 2, 2021

(65) Prior Publication Data
US 2023/0064500 A1 Mar. 2, 2023

(51) Int. Cl.
*G06F 9/50* (2006.01)
*G06F 9/455* (2018.01)
*G06F 9/48* (2006.01)
*G06N 20/00* (2019.01)
*H04B 17/345* (2015.01)

(52) U.S. Cl.
CPC .......... *G06F 9/505* (2013.01); *G06F 9/45558* (2013.01); *G06F 9/4881* (2013.01); *G06F 9/5038* (2013.01); *G06F 9/5055* (2013.01); *G06N 20/00* (2019.01); *H04B 17/345* (2015.01); *G06F 2009/4557* (2013.01); *G06F 2009/45595* (2013.01); *G06F 2209/501* (2013.01); *G06F 2209/5019* (2013.01)

(58) Field of Classification Search
CPC .. G06F 9/5055; G06F 9/45558; G06F 9/4881; G06F 9/5038; G06F 2009/4557; G06F 2009/45595; G06F 2209/501; G06N 20/00; H04B 17/345
See application file for complete search history.

(56) References Cited

U.S. PATENT DOCUMENTS

| | | | |
|---|---|---|---|
| 2021/0224665 A1* | 7/2021 | Cheng | G06N 20/00 |
| 2022/0263688 A1* | 8/2022 | Srisooksai | B61L 3/12 |
| 2022/0400464 A1* | 12/2022 | Bhorkar | H04W 64/00 |

FOREIGN PATENT DOCUMENTS

JP 2020052703 A 4/2002

* cited by examiner

*Primary Examiner* — Jacob D Dascomb
(74) *Attorney, Agent, or Firm* — Procopio, Cory, Hargreaves & Savitch LLP

(57) ABSTRACT

Example implementations described herein involve systems and methods to select machine learning models that will be executed in a cellular Mobile Edge Computing for cellular enabled applications. In contrast to related art implementations, the example implementations described herein considers different data fidelities of received data due to the cellular wireless channel and also performs service resource allocation accordingly.

17 Claims, 16 Drawing Sheets

| QoS Level | Minimum Accuracy | Maximum Application Latency |
|---|---|---|
| 2 (high) | 95% | 1 msec |
| 1 (medium) | 90% | 2 msec |
| 0 (low) | 90% | 5 msec |

FIG. 4

| Camera ID: C0001 | | | | |
|---|---|---|---|---|
| | Interference Level = 0 | Interference Level = 1 | ... | Interference Level = M |
| Signal Level = 0 | Data Set $D_{00}$ | Data Set $D_{01}$ | | Data Set $D_{0M}$ |
| Signal Level = 1 | Data Set $D_{10}$ | Data Set $D_{11}$ | | Data Set $D_{1M}$ |
| ⋮ | | | | |
| Signal Level = N | Data Set $D_{N0}$ | Data Set $D_{N1}$ | | Data Set $D_{NM}$ |

FIG. 7

| Camera ID: C0001 | | | | |
|---|---|---|---|---|
| | Interference Level = 0 | Interference Level = 1 | ... | Interference Level = M |
| Signal Level = 0 | Fidelity Level =0 | Fidelity Level =0 | | Fidelity Level =5 |
| Signal Level = 1 | Fidelity Level =0 | Fidelity Level =1 | | Fidelity Level =5 |
| : | | | | |
| Signal Level = N | Fidelity Level =5 | Fidelity Level =5 | | Fidelity Level =10 |

FIG. 8

| Camera ID: C0001 | | | |
|---|---|---|---|
|  | Fidelity Level = 0 | Fidelity Level = 1 | ... |
| Training Data | {$D_{00}$, $D_{10}$, $D_{01}$} | {$D_{11}$, ...} | |

FIG. 9

| Camera ID: C0001 | | | | | | |
|---|---|---|---|---|---|---|
| Application Information: {'ID': id, 'Name': 'name_string', 'QoS Level': 2} | | | | | | |
| | Fidelity Level = 0 | | | Fidelity Level = 1 | | |
| Algorithm ID | $NN_{01}$ | $NN_{02}$ | ... | $NN_{11}$ | $NN_{12}$ | ... |
| Algorithm Type | Architecture A | Architecture A | | Architecture A | Architecture C | |
| # Hidden Layers | 100 | 150 | | 100 | 200 | |
| # units/hidden layer | 10 | 15 | | 10 | 20 | |
| ... | | | | | | |
| Accuracy Metric | 90% | 92% | | 92% | 94% | |
| FLOPs/inference (normalized) | 65 | 70 | | 65 | 95 | |
| | 501 | 502 | | 503 | 504 | |

FIG. 11

| Camera ID: C0001 | | | | | | |
|---|---|---|---|---|---|---|
| Application Information: {'ID': id, 'Name': 'name_string', 'QoS Level': 2} | | | | | | |
| | Fidelity Level = 0 | | | Fidelity Level = 1 | | |
| Algorithm ID | $NN_{01}$ | $NN_{02}$ | ... | $NN_{11}$ | $NN_{12}$ | ... |
| Algorithm Type | Architecture A | Architecture A | | Architecture A | Architecture B | |
| # Hidden Layers | 100 | 150 | | 100 | 200 | |
| # units/hidden layer | 10 | 15 | | 10 | 20 | |
| ... | | | | | | |
| Resource (assuming AWS implementation) | Compute: EC2 instance #E0000 and storage RDS instance #S000 | Compute: EC2 instance #E0001 and storage RDS instance #S001 | | Compute: EC2 instance #E0002 and storage RDS instance #S002 | Compute: EC2 instance #E0003 and storage RDS instance #S003 | |
| Accuracy Metric | 90% | 92% | | 92% | 94% | |
| Inference Latency Metric (ms) | 1 ms | 1.5 ms | | 1 ms | 2 ms | |

OPTIMIZING MACHINE LEARNING AS-A-SERVICE PERFORMANCE FOR CELLULAR COMMUNICATION SYSTEMS

BACKGROUND

Field

The present disclosure is generally directed to cellular communication network systems, and more specifically, to the application of machine learning models in such systems.

Related Art

Cellular communication systems, such as beyond 4G Long Term Evolution (LTE) systems (i.e., 5G and beyond) are being rapidly deployed for many industrial Internet of Things (IoT) applications due to their ubiquitous connectivity and ability to host scalable applications at the edge of the telco networks. These applications will be served by machine learning (ML) models. Due to the time varying nature of the wireless cellular network in such systems, the received data fidelities that are input to these models can vary in an unpredictable way.

SUMMARY

In related art implementations, ML models are developed without active consideration of the phenomenon in the received data fidelities. At most, such related art implementations consider cases when data fidelities are different, but try to train a single model that is robust over all fidelities. The model performance can be improved by training different ML models for different groups of data fidelities and then selecting service platform resources (such as compute and storage resources of the virtual machine (VM)/container) to execute these models based on data fidelities and also on application Quality of Service (QoS). The example implementations described herein are focused on such aspects.

Example implementations address the received data fidelities in cellular communication systems through the use of functions that obtain the signal level and interference information in the application layer. Such example implementations can be utilized in cellular communication systems such as beyond 4G LTE systems through using the functions defined into such systems.

In example implementations for the training and operating of ML models, there are runtime environments (e.g., VM/containers), to each of which cellular enabled applications are assigned. Each of the applications can involve several ML model options, each of which are associated with appropriate data fidelity levels (e.g., a first model A is good for a first data set B having good quality, and a second model A' is good for a second data set B' with low quality). In example implementations, the compute/storage resource allocation for each runtime environment that is implementing a application based on the QoS level assigned to the application and fidelity associated to the ML model which is included in the application, and to train each of the ML models (A and A') separately using the allocated resource to each application/model.

In example implementations for the operation of the ML models and the c applications, one of the ML models is selected for each of the applications based on the current data fidelity, allocating the resource for execution of the application with the selected ML model, based on application QoS (considering all applications that have to be operated simultaneously) and data fidelity, and executing the application accordingly using the allocated resources.

Aspects of the present disclosure can involve a method, which can include training each of a plurality of machine learning models for an application assigned to one or more runtime environments in which data is obtained via a cellular network, the training of the each of the plurality of machine learning models for the application conducted separately, the training involving training the each of the plurality of machine learning models selected with a plurality of data sets to form a plurality of trained machine learning models, each of the plurality of data sets associated with a different fidelity level; outputting model latency information for each of the plurality of trained machine learning models; allocating resources to the one or more runtime environments based on a Quality of Services (QoS) level assigned to the application and the model latency information associated with the each of the plurality of machine learning models; and storing the each of the plurality of trained machine learning models and associated data fidelity levels in a model catalog; wherein the data fidelity level is calculated based on a signal level and interference obtained in the application layer.

Aspects of the present disclosure can involve a computer program, which can include instructions involving training each of a plurality of machine learning models for an application assigned to one or more runtime environments in which data is obtained via a cellular network, the training of the each of the plurality of machine learning models for the application conducted separately, the training involving training the each of the plurality of machine learning models selected with a plurality of data sets to form a plurality of trained machine learning models, each of the plurality of data sets associated with a different fidelity level; outputting model latency information for each of the plurality of trained machine learning models; allocating resources to the one or more runtime environments based on a Quality of Services (QoS) level assigned to the application and the model latency information associated with the each of the plurality of machine learning models; and storing the each of the plurality of trained machine learning models and associated data fidelity levels in a model catalog; wherein the data fidelity level is calculated based on a signal level and interference obtained in the application layer. The computer program can be stored in a non-transitory computer readable medium and executed by one or more processors.

Aspects of the present disclosure can involve a system, which can include means for training each of a plurality of machine learning models for an application assigned to one or more runtime environments in which data is obtained via a cellular network, the training of the each of the plurality of machine learning models for the application conducted separately, the training involving means for training the each of the plurality of machine learning models selected with a plurality of data sets to form a plurality of trained machine learning models, each of the plurality of data sets associated with a different fidelity level; means for outputting model latency information for each of the plurality of trained machine learning models; means for allocating resources to the one or more runtime environments based on a Quality of Services (QoS) level assigned to the application and the model latency information associated with the each of the plurality of machine learning models; and means for storing the each of the plurality of trained machine learning models and associated data fidelity levels in a model catalog;

wherein the data fidelity level is calculated based on a signal level and interference obtained in the application layer.

Aspects of the present disclosure can involve an apparatus, which can involve a processor, which can be configured to train each of a plurality of machine learning models for an application assigned to one or more runtime environments in which data is obtained via a cellular network, the training of the each of the plurality of machine learning models for the application conducted separately, by training the each of the plurality of machine learning models selected with a plurality of data sets to form a plurality of trained machine learning models, each of the plurality of data sets associated with a different fidelity level; outputting model latency information for each of the plurality of trained machine learning models; allocating resources to the one or more runtime environments based on a Quality of Services (QoS) level assigned to the application and the model latency information associated with the each of the plurality of machine learning models; and storing the each of the plurality of trained machine learning models and associated data fidelity levels in a model catalog; wherein the data fidelity level is calculated based on a signal level and interference obtained in the application layer.

BRIEF DESCRIPTION OF DRAWINGS

FIG. 4 illustrates an example of the application QoS information, in accordance with an example implementation.

FIG. 7 illustrates an example of the first step of a data fidelity partition module, in accordance with an example implementation.

FIG. 8 illustrates an example of the second step of a data fidelity partition module, in accordance with an example implementation.

FIG. 9 illustrates an example of the third step of a data fidelity partition module, in accordance with an example implementation.

FIG. 11 illustrates an example output of the final ML model section module, in accordance with an example implementation.

FIG. 13 illustrates an example of the ML catalogue database, in accordance with an example implementation.

DETAILED DESCRIPTION

Figure 1:
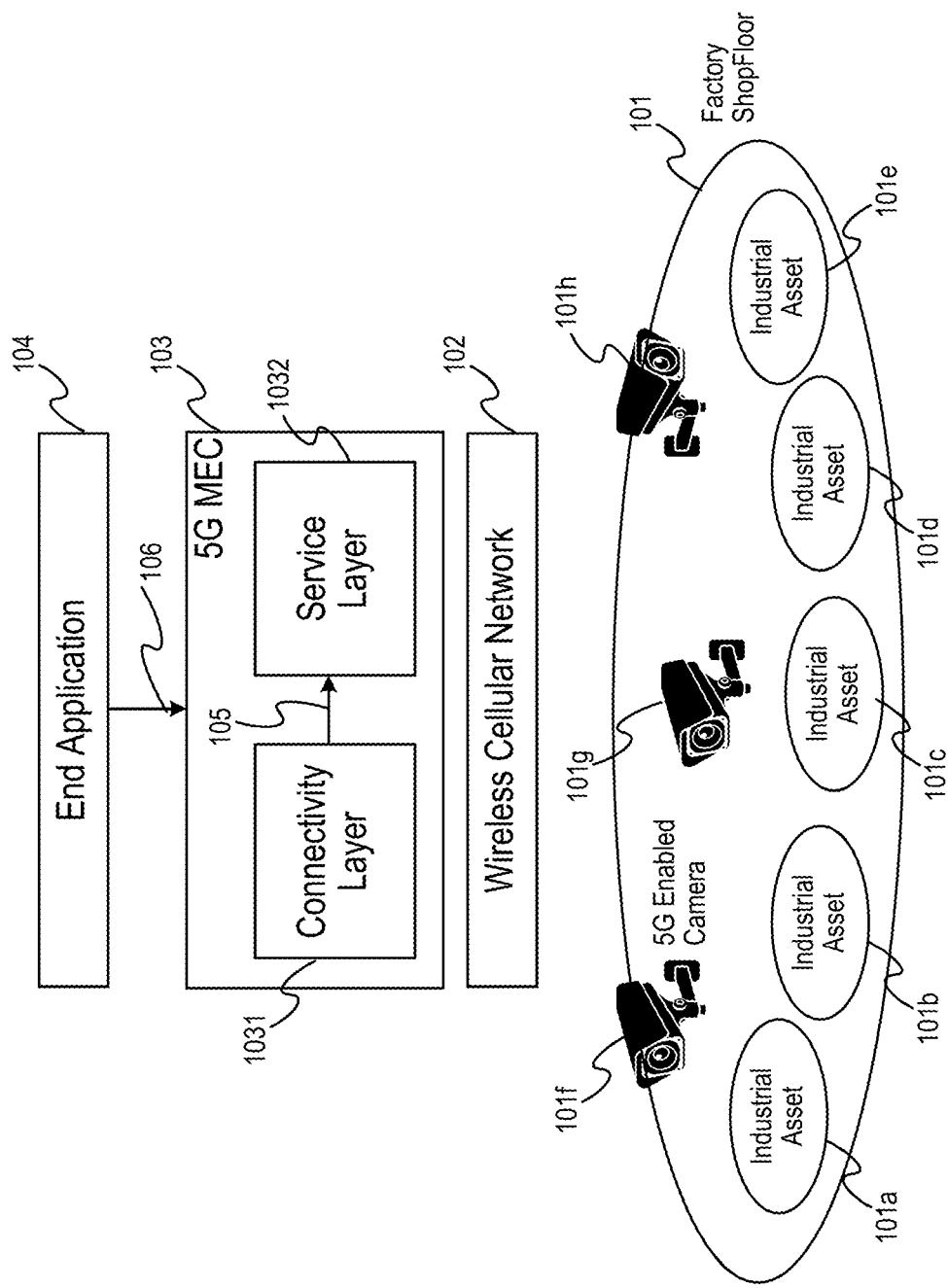
FIG. 1 illustrates an example cellular enabled industrial IoT application system, such as a smart factory, in accordance with an example implementation.

The following detailed description provides details of the figures and embodiments of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Embodiments as described herein can be utilized either singularly or in combination and the functionality of the embodiments can be implemented through any means according to the desired implementations.

FIG. 1 illustrates an example cellular enabled industrial IoT application system, such as a smart factory, in accordance with an example implementation. A factory shopfloor 101 can include multiple assets 101a-101e which could be machines, assembly lines of workcells with human workers. These are being continuously monitored by cellular enabled cameras 101f-101h. The data captured by these cameras are streamed over the wireless cellular network 102 to a cellular Mobile Edge Computing (MEC) server 103 which is hosted locally in the field (e.g. datacenter inside factory). The MEC server 103 can involve a connectivity layer 1031 that handles the wireless and IP level data connectivity between the camera 101f-101h and the MEC 103 and a service layer 1032 that builds ML applications based on this data. The information exchanged from connectivity layer 1031 to service layer 1032 is denoted by 105 and involves the IP level data and also metadata such as information about the connectivity layer conditions. The end application 104 is communicatively coupled to the MEC 103 through a network connection 106.

Due to the dynamic connectivity conditions of wireless cellular network 102, several problems can occur. The fidelity of received data in the service layer fluctuates with time in a random manner. For example, the received images could be blurred, have missing segments or corrupted with noise all of which reduce fidelity. The fidelity of received data can be much lower than transmitted data. Due to this, the overall application latency can increase in a random manner. To address such problems, the following technical solution is proposed.

Figure 2:
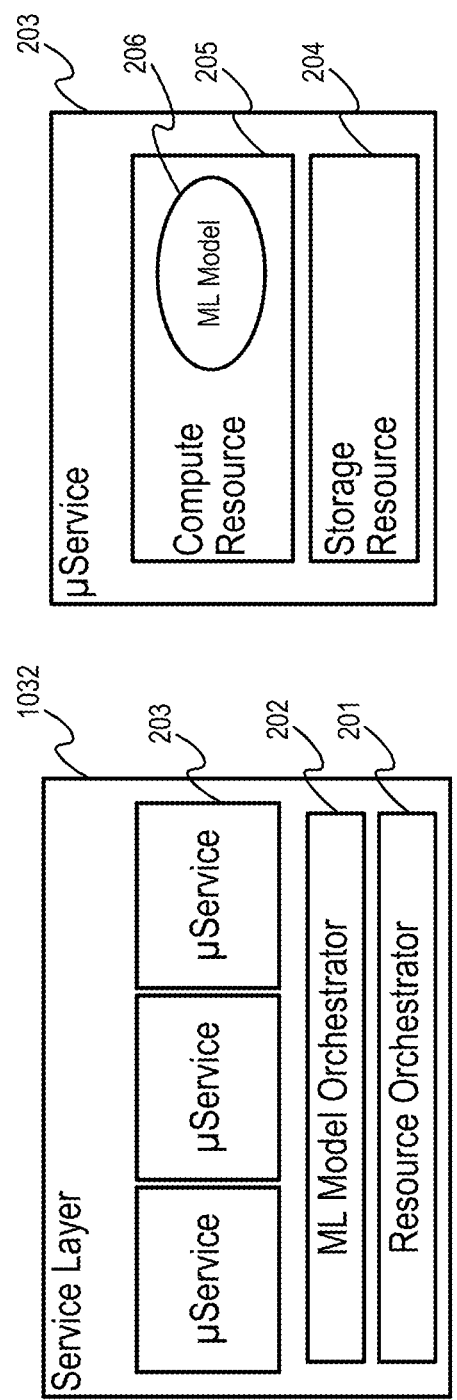
FIG. 2 illustrates an example architecture for the cellular service layer, in accordance with an example implementation.

FIG. 2 illustrates an example architecture for the cellular service layer, in accordance with an example implementation. The service layer 1032 is shown in more detail in FIG. 1. The service layer 1032 can involve hardware resource (compute/storage) orchestrators 201 over which several ML microservices 203 are executed with the help of a ML model orchestrator 202. These microservices are dedicated runtime environments (VM/containers) for each ML model and can involve allocated compute resources 205 where the ML model algorithm 206 runs and the associated data is stored in allocated storage resource 204.

Figure 3:
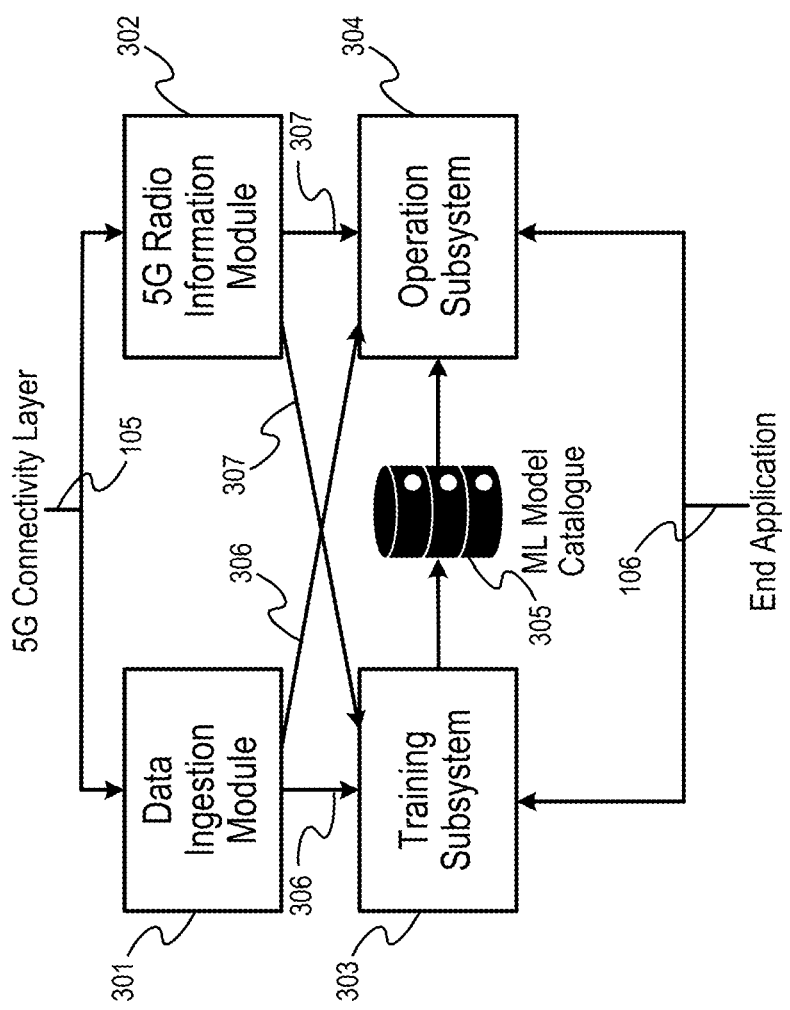
FIG. 3 illustrates an example architecture for ML model as a service for a cellular service layer, in accordance with an example implementation.

FIG. 3 illustrates an example architecture for ML model as a service for a cellular service layer, in accordance with an example implementation. The architecture can involve the following components. A data ingestion module 301 is configured to take in the data from the connectivity layer 105 and pre-process it in an appropriate manner so that ML models can be trained. Examples of such operations can be data filtering, data normalization, data transformation and other standard methods that are established in the ML model.

A cellular radio information module 302 can be configured to interact with the APIs provided by the cellular connectivity layer to obtain real time radio level status of the cellular wireless cellular network. There can be two such types of status information. The first type relates to how strong the received signal from a sample camera (for example 101*f*) is when it reaches the MEC 103. This is called signal strength 'S'. The second type is how much radio level interference is caused by all other cameras (in this example 101*g*, 101*h*) to the received signal of 101*f*. This is called interference I. Both these metrics can be used to determine the fidelity of the received data and hence the choices that are utilized.

A training subsystem 303 is configured to take in the data 306 from data ingestion module 301 and trains multiple ML models based on the cellular radio information 307 from cellular radio information module 302. The training subsystem 303 also allocates compute storage/compute resources to the runtime environment (such as VM or container) that implements the model based on the cellular radio information 307 from the cellular radio information module 302 and the QoS requirements of the application via signal 106.

A model catalogue 305 is configured to store the ML models and associated resources of their runtime environment from training subsystem 303.

An operating subsystem 304 is configured to take in the data 306 from data ingestion module 301, select a single trained model and the associated runtime environment resources from the model catalogue 305 based on cellular radio information 307 from cellular radio information module 302 and the QoS requirements of the application via signal 106 to perform operating/testing.

FIG. 4 illustrates an example of the application QoS information 106, in accordance with an example implementation. The application QoS information 106 can include several defined QoS classes. Each class is associated with a minimum accuracy and a maximum latency in accordance with the desired implementation.

With respect to accuracy, there could be several metrics to capture accuracy and the correct way to do so will depend on the desired application. For example, if the application is classifying multiple objects based on the input image (workers, machines, assembly lines) then mAP (mean average precision) can be considered, which measures how precise the algorithm is in classifying all the labels in average. For example, an evaluation of the algorithm according to any desired implementation determines that the algorithm can detect fire with 95% accuracy after one million operations, and use that value in the mAP for detection of other objects that the algorithm is trained to detect. Other metrics for accuracy can be utilized in accordance with the desired implementation (e.g., different weight for accuracy score applied to different objects, standard deviation of percentage of accuracy percentage, etc.), and the present disclosure is not limited thereto.

No matter what metric is chosen, accuracy (in the broad sense of the word) depends on the quality/fidelity of received data and the accuracy performance of the ML model. With respect to the quality/fidelity of the received data, more and better data tends to result in more accuracy. This is where the radio conditions of the cellular channel can cause problems. With respect to the accuracy performance of the ML model (for given data quality), accuracy is measured for a given fidelity of data (e.g, model detects fire with 95% accuracy for a given fidelity of data). Accordingly, each data fidelity level can cause a different level of accuracy, and the required accuracy can also be adjusted depending on the present data fidelity level in accordance with the desired implementation.

Latency is indicative of the time taken after the occurrence of the event for the algorithm to provide detection. Latency can depend on the latency performance of the ML model (e.g., model detects fire with 95% accuracy after 100 iterations), which can be measured in terms of FLOPs (Floating point Operations) per ML event (such as operating/testing). In an example, model A detects fire with 95% accuracy after 1 million FLOPs, but model B detects fire with 99% accuracy after 2 million FLOPs.

Compute and Storage resources can be used to execute the ML microservice which determines how quickly a floating point operation can be performed. For example, if model B is selected, more resources can be allocated to the model so that each FLOP is executed faster during runtime and the overall latency of both models is comparable in units of time. This can be important as the end application requirements will be stated in units of time and not FLOPs.

In example implementations, the latency metric considered is mainly operating/testing latency, however, the present disclosure is not limited thereto and other latency metrics can be used in accordance with the desired implementation.

Figure 5:
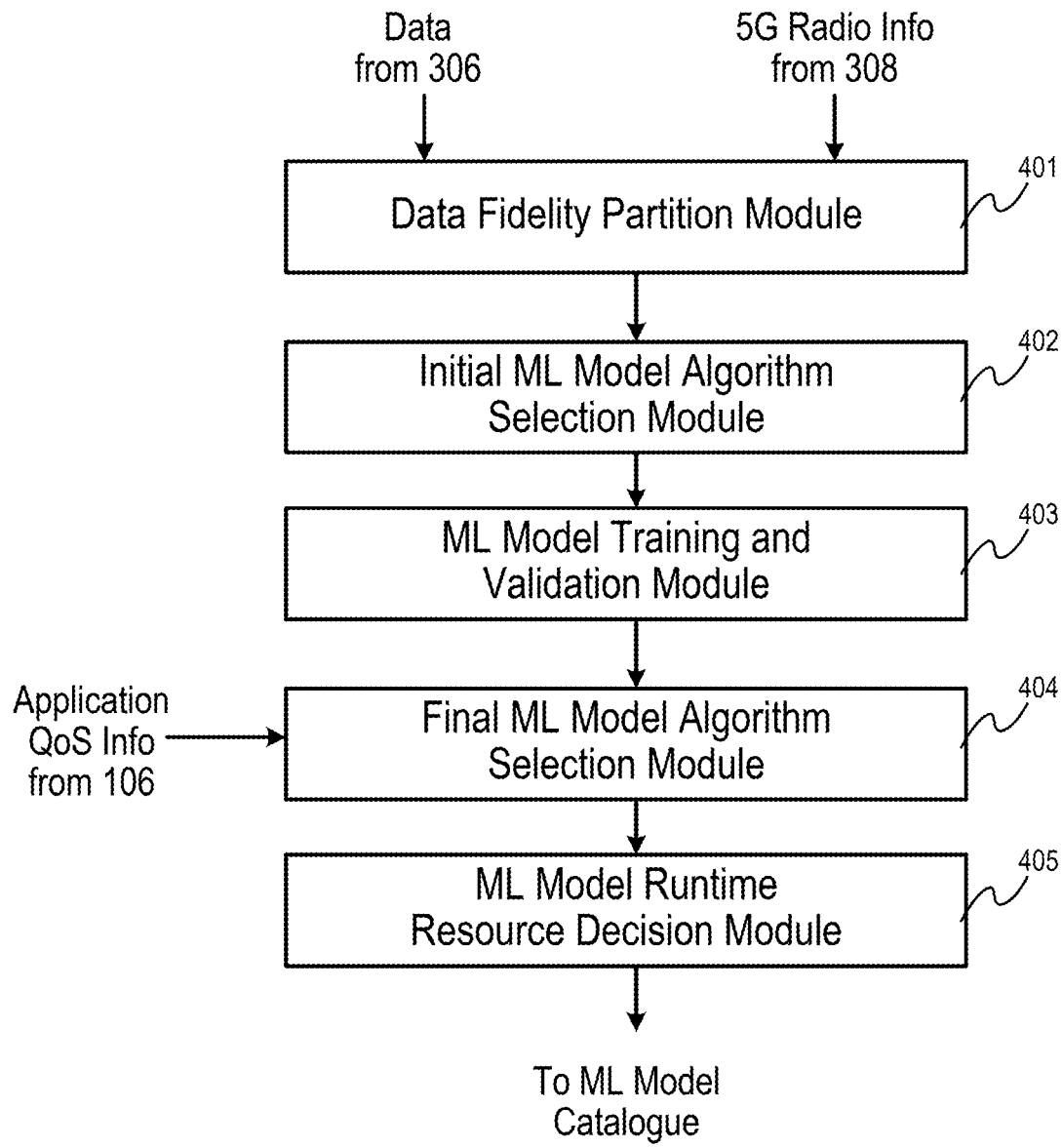
FIG. 5 illustrates an example of the training subsystem, in accordance with an example implementation.

FIG. 5 illustrates an example of the training subsystem 303, in accordance with an example implementation. The example implementations involve the following modules.

Data Fidelity Partition Module 401 groups data based on estimates of the received fidelities of the received images. This depends on the cellular radio conditions and thus is an estimate which may not be exactly known at the MEC. Example implementations address such an issue through techniques as described with respect to FIG. 6, for which examples are provided in FIGS. 7 to 9.

Initial ML Model Algorithm Selection Module 402 selects several ML model algorithms that it believes will have {accuracy, latency} characteristics that will meet the application requirements. This belief is based on prior knowledge (as further explained in FIG. 11) and will be updated in Module 404 when their performance is computed for the different data groups derived in Module 401 of our actual data set.

ML Model Training and Validation Module 403 intakes the initial set of models selected in Module 402 and executes on the data obtained from Module 401. The actual {accuracy, latency} values of ML model algorithms selected in node 402 are now available and as described further herein.

Final ML Model Selection Module 404 intakes the QoS requirements of the application via signal 106, determines which ML algorithms do not meet the accuracy specifications of the application, and rejects them from the initial set of algorithms selected in Module 402. An example of the output of ML Model Training and Validation Module 403 is provided in FIG. 11, which provides the model accuracy information and model latency information of an algorithm. Based on the signal 106, the required model accuracy and required model latency of the application can be obtained. If the model accuracy of the algorithm is less than the required model accuracy, then the algorithm can thereby be rejected by module 404.

ML Model Runtime Resource Decision Module 405 decides how to allocate compute and storage resources to the runtime environment to the models from Module 404 to meet the application level latency requirements. Note that these resources are allocated for the operating/testing process and not for training (even though the module is currently at the training subsystem). This is because application QoS latency is only for the operating/testing phase and resources have to be assigned accordingly.

Figure 6:
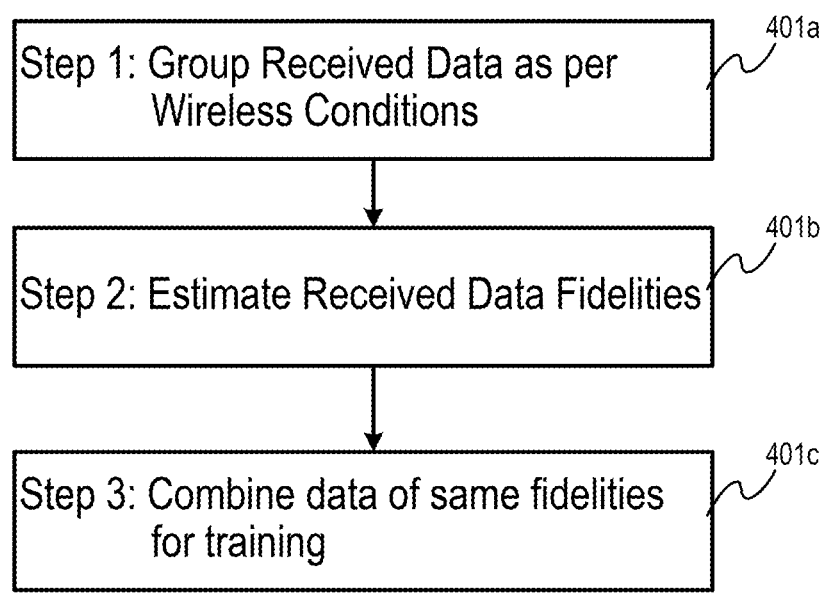
FIG. 6 illustrates an example of a data fidelity partition module, in accordance with an example implementation.

FIG. 6 illustrates an example of a data fidelity partition module 401, in accordance with an example implementation. As a first step 401*a*, example implementations ascertain the received signal level 'S' of the radio signal from a camera and interference 'I' from all other cameras. Note that this information can be obtained at the application level in MEC (e.g., as a key feature provided by a standard such as 5G standard). Signal and interference information is key to any cellular system design, but previously such information was confined within the connectivity module and never available to the service layer. Using this information, the example implementations collect data over a time period and perform an initial grouping based on combinations of S and I that were observed during that time period. An example is provided in FIG. 7.

As a second step 401*b*, example implementations can estimate received data fidelity from 'S' and 'I' as $$\text{Fidelity} = \frac{S}{I+N},$$

where N is constant that the example implementations can learn based on past history of how well the ML model performed based on the methodologies described herein. Example implementations apply a function that takes at input, the value generated by the above equation and produces discrete levels as outputs (which is called a data fidelity level herein). An example of the result of this operation is shown in FIG. 8. As illustrated in FIG. 8, several different combinations of 'S' and 'I' can lead to the same data fidelity level, which is intuitively sound as it is their ratio that matters.

In a third step 401*c*, example implementations perform a second grouping of data such that data belonging to the same data fidelity level are grouped together. Based on the examples on FIG. 7 and FIG. 8, such a grouping can be generated as illustrated in FIG. 9.

The Initial ML Model Algorithm Selection Module 402 selects algorithms based on any implementation in the related art. For each data fidelity, this module considers separate model groups and each model group involves multiple model algorithms. The main reason for having different model groups (i.e., more than one model for a given fidelity) for different fidelities is that accuracy performance for models depends on data fidelity, and hence the option of training different ML algorithms for different fidelities will do better than training a fixed model. The reason for considering so many options will be described herein, with respect to the Operation Subsystem 304, but the basic idea is that during the operating/testing operations phase, the resources allocated to a model will depend not only on its own application, but also on all other applications that have to be co-scheduled. In such a scenario, having a larger pool of models to choose from (for a given fidelity) helps in optimizing the operations of operation subsystem module 304.

Figure 10:
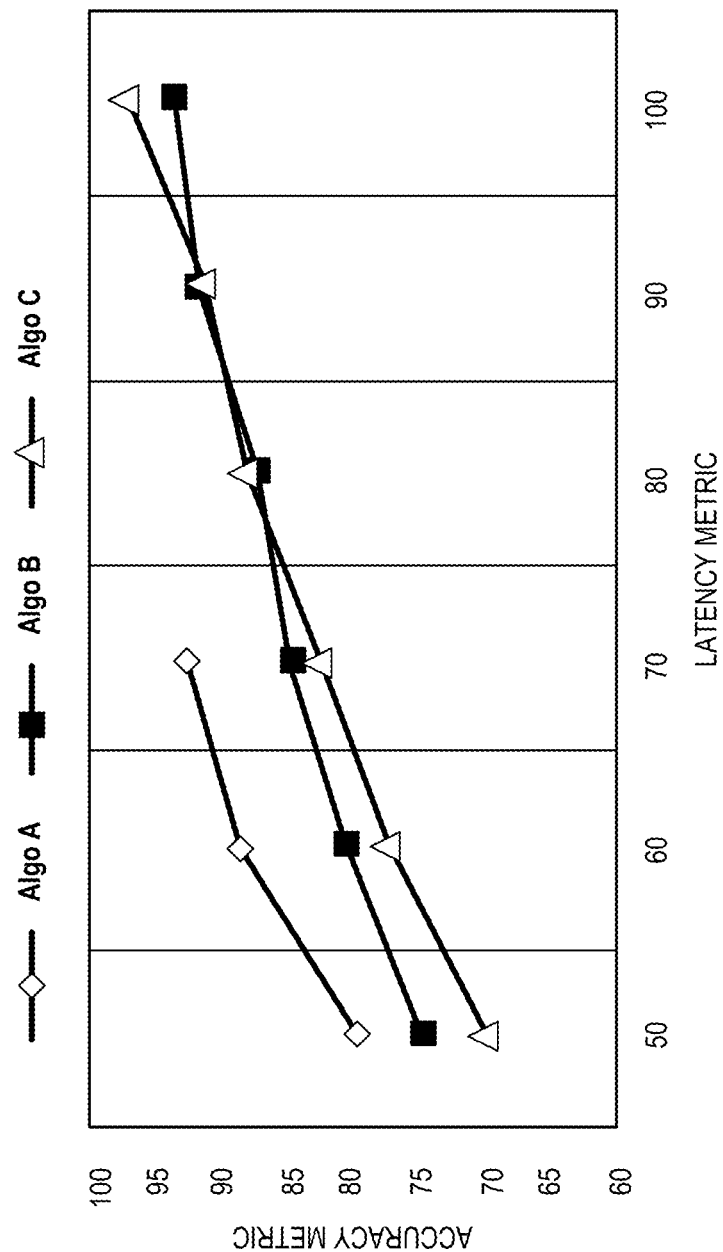
FIG. 10 illustrates an example of different model algorithms with different {accuracy, latency} characteristics, in accordance with an example implementation.

For obtaining multiple models in a group, example implementations can either choose different ML model algorithms and/or have the same ML model algorithm with different choices of hyperparameters. This is because accuracy/latency tradeoffs of a particular ML model algorithm can thereby be made through different choices of model hyperparameters (e.g., number of hidden layers, nodes per hidden layer etc.). FIG. 10 illustrates an example of different model algorithms with different {accuracy, latency} characteristics, in accordance with an example implementation. For example, if the application is image recognition and classification, then model algorithm A can involve YOLO, algorithm B can be R-FCN and algorithm C can be Retinanet. Within each algorithm, a trade off between latency and accuracy can thereby be made. Note the figure is just an example and not representative of real performances of any of the algorithms mentioned.

In the ML Model Training and Validation Module 403, the initial set of ML models selected in Module 402 are trained and validated for the actual data groups from Module 401.

The Final ML Model Section Module 404 takes model evaluation input from module 403, the application accuracy requirements and selects only those ML algorithms that meet this requirement. The output of the module is shown in FIG. 11, which is an example of the output of the final ML model section module in a tabular form. Information in the table can involve the data source (camera ID), application QoS information, various ML algorithms 501, 502, 503, 504 and so on. For each ML algorithm information, the following information is further stored.

Algorithm ID and algorithm type: Examples of algorithm type could be YOLO, R-FCN, Retinanet, and so on.

Algorithm hyperparameters which can involve hidden layers, nodes per hidden layer and so on.

Algorithm accuracy for a given choice of hyperparameters and data fidelity.

Algorithm latency (i.e. ML model latency information) for a given choice of hyperparameters and data fidelity.

Figure 12:
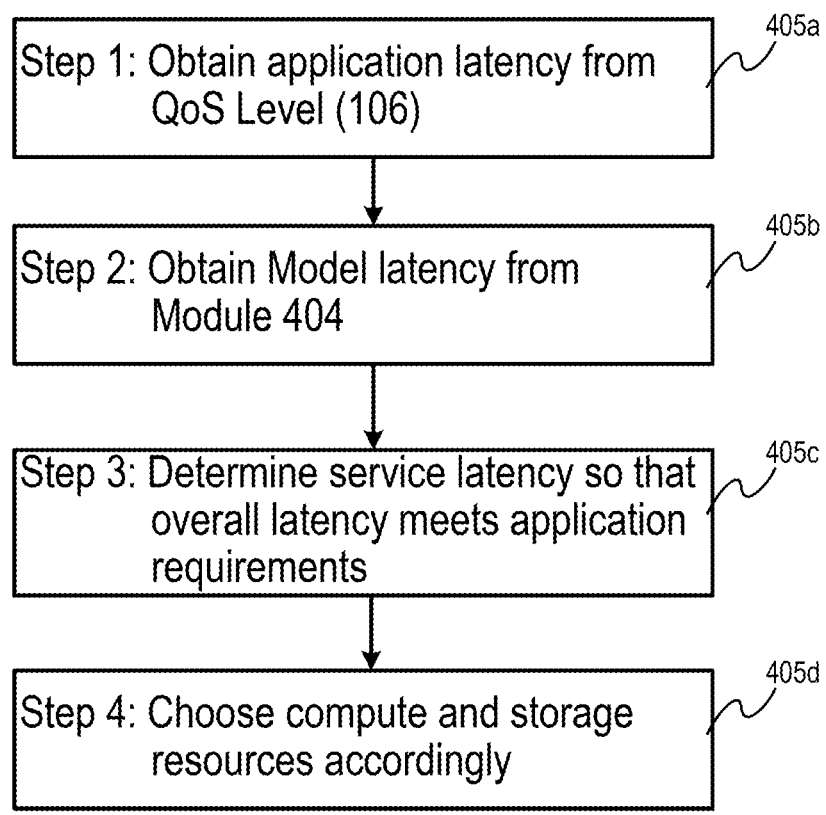
FIG. 12 illustrate the working of the ML model runtime resource decision module, in accordance with an example implementation.

FIG. 12 illustrate the working of the ML Model Runtime Resource Decision Module 405, in accordance with an example implementation. As a first step 405*a*, example implementations obtain the application level QoS latency information (in terms of units of time) from signal 106, referred to herein as 'L1'. As a second step 405*b*, example implementations obtain the ML model latency information (in units of FLOPs) from module 404, referred to herein as 'F'. As a third step 405*c*, example implementations determine the desired service latency (i.e. latency when ML algorithm is assigned a runtime environment during operating/testing), which should be equal or less than the value obtained in step 405*a*, and is referred to herein as 12'. As a fourth step 405*d* example implementations choose compute and storage resources 'R' of the runtime environment so that the service latency is met. This is performed as follows:

$$L2 \leq L1$$

$$L1 = F*R$$

Where R is the time taken to execute one FLOP and step 405*d* will chose resources to meet this value. Depending on the desired implementation, R can be correlated with available memory and compute resources in accordance with any desired function in accordance with the desired implementation.

The results of module 405 is stored in a ML catalogue database 305. An example of the database is shown in FIG. 13. It is similar to the Final ML Model Algorithm Decision Module 404 with additional information about the resources that need to be allocated during runtime for each ML model algorithm as shown at 601, 602, 603, and 604. Further, because of such information the latency is now in units of actual time and not FLOPs.

Figure 14:
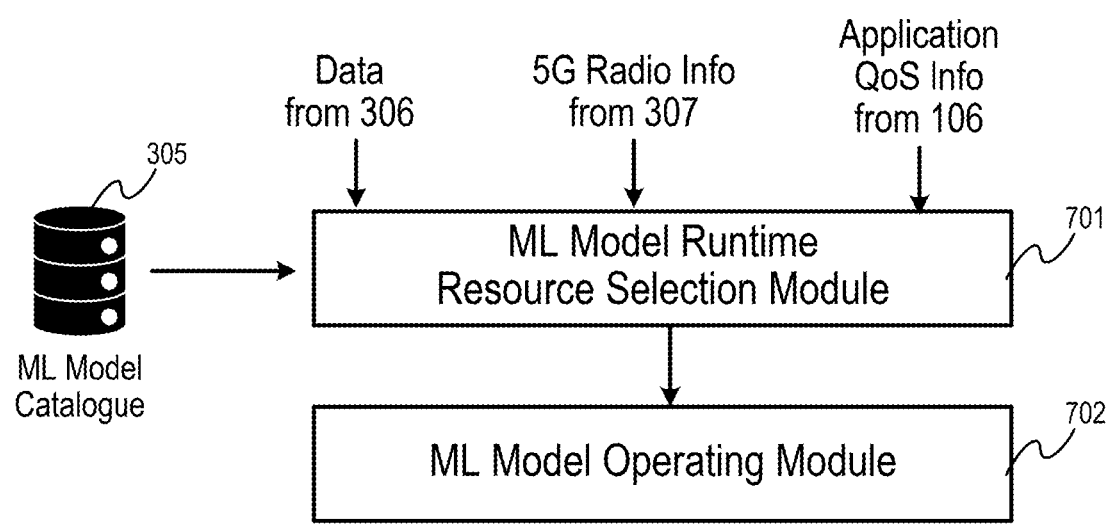
FIG. 14 illustrates the details of the Operating/Testing Subsystem which executes during the operating/testing time, in accordance with an example implementation.

FIG. 14 illustrates the details of the Operating/Testing Subsystem 304 which executes during the operating/testing time, in accordance with an example implementation. This has the following modules.

ML Model and Runtime Resource Selection Module 701 takes into input all the stored models in the model catalogue 305 and decides which one to use during operating/testing. The data, radio conditions and application QoS can be considered for the operating/testing decision. The key innovation in the step is that a joint optimization over all applications are executed simultaneously in a given time period. This can pose a challenge as each application runtime environment has to be allocated compute and storage resources, but the total resources in the MEC is finite. Thus, it may not be possible to allocate the 'best' ML models for each application (e.g., least latency and highest accuracy) if the resources are insufficient.

This situation does not arise during the training phase 303, as training is offline and hence there was no notion of ML models having to be trained simultaneously. For training, existing resource allocation and orchestration techniques of MEC will suffice.

Figure 15:
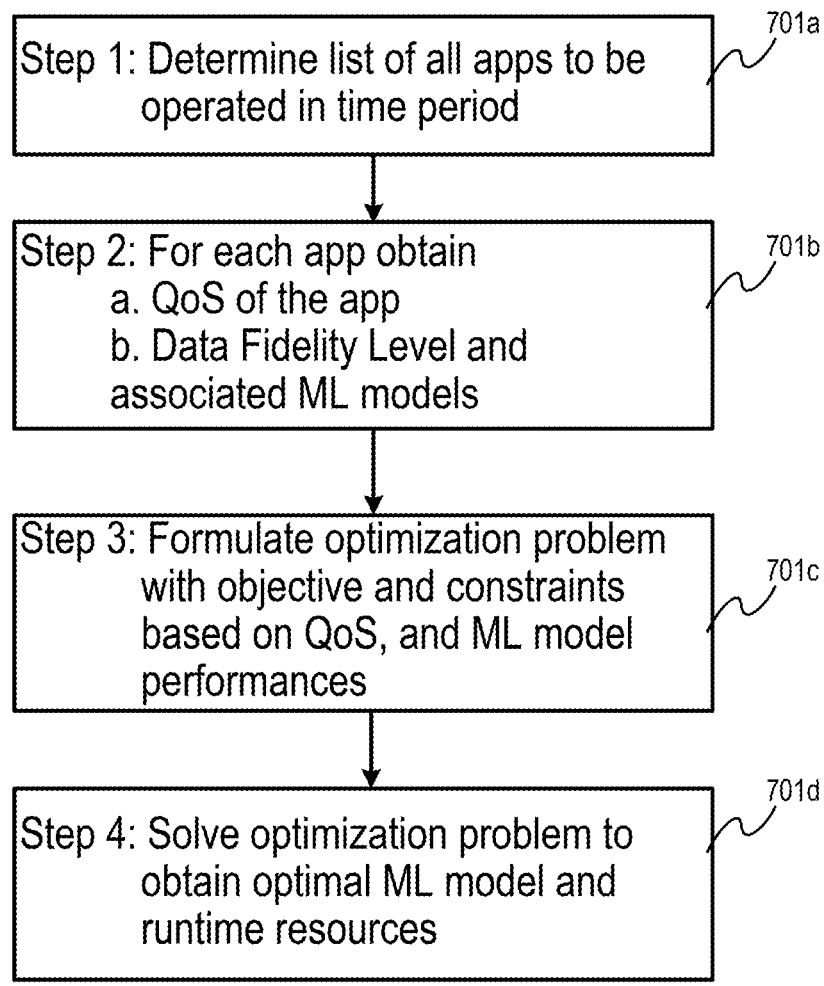
FIG. 15 illustrates an example flow of the ML model and runtime resource selection module, in accordance with an example implementation.

FIG. 15 illustrates an example flow of the ML model and runtime resource selection module 701, in accordance with an example implementation. The details of the joint optimization are shown in FIG. 15.

As a first step 701a, the example implementations determine the list of all applications that have to be operated in the present time period. Let there be N such applications numbered i=1, . . . , N. Also, since we are talking about operating/testing, these time periods are short in the order of seconds or minutes.

As a second step 701b, for each application i, example implementations obtain the QoS level qi, the data fidelity level fi of data received by the application i during the given time period. The fidelity level fi of current runtime environment can be calculated by using the signal level and interference information of the received information. For data fidelity level fi, the example implementations choose the corresponding ML models from catalogue 305. Let Mi be the set of ML models for application i. Denote mi as an entry in the set of models Mi and acc(mi) and lat(mi), the accuracy and latency values of model mi.

As a third step 701c, example implementations formulate an optimization problem to obtain the optimal allocation of ML model mi for each i. This will be of the form $$\max_{m1,m2,\ldots,mN} \sum_{i=1}^{N} f(qi) * acc(mi)$$

s.t. $lat(mi) <$ application latency $mi \in Mi$ for all $i$

Here f(qi) is any continuous increasing function of qi.

As a fourth step 701d, example implementations solve the optimization problem in 701c to obtain the optimal models mi.

ML Model Operating Module 702 is where the selected ML models from step 701d are executed using the resources also selected in step 701d.

The performance of ML models degrades when the data is subject to transmission over a wireless cellular channel. The example implementations use capabilities provided by the standards and proposes a solution to overcome this problem and improve the performance.

Figure 16:
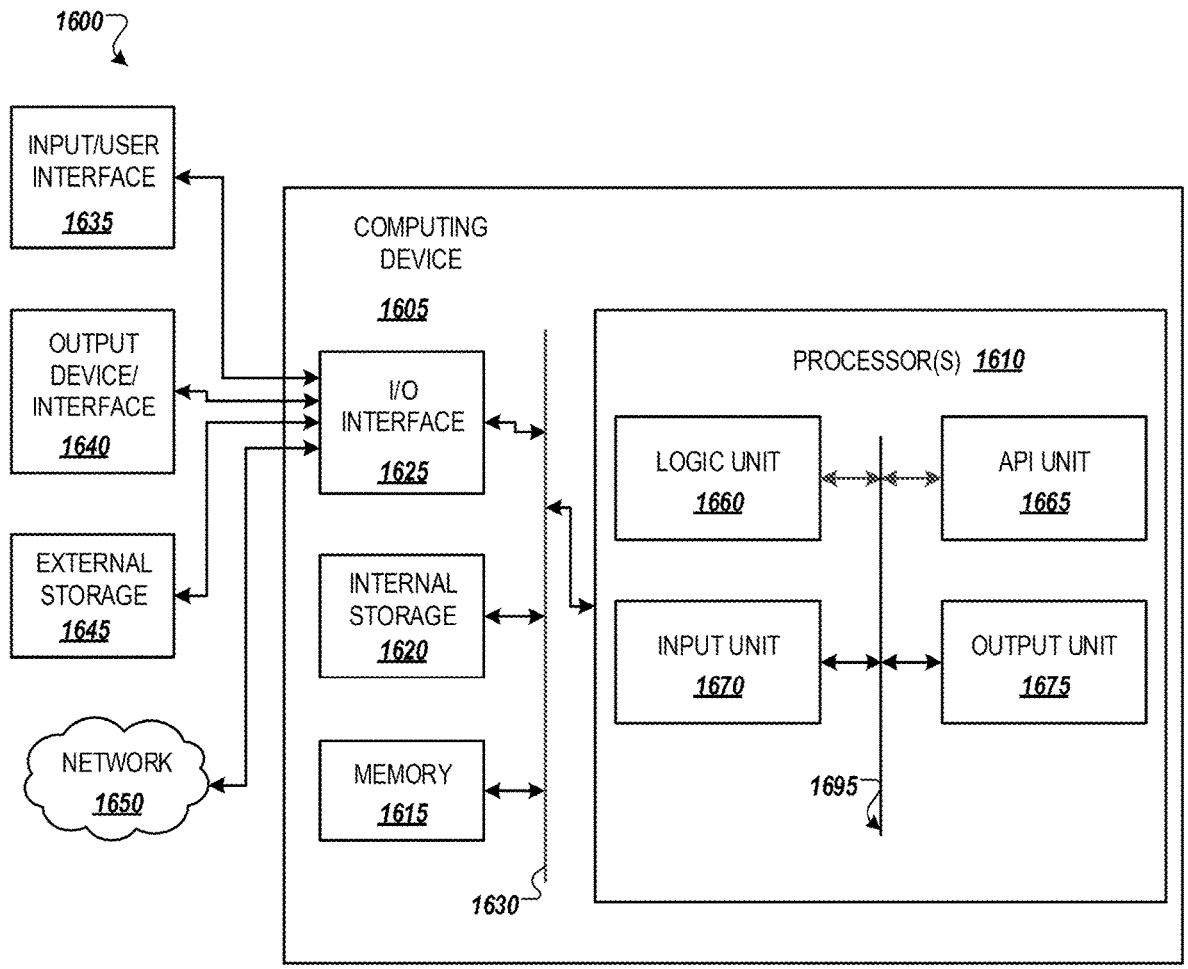
FIG. 16 illustrates an example computing environment with an example computer device suitable for use in some example implementations.

FIG. 16 illustrates an example computing environment with an example computer device suitable for use in some example implementations, such as an MEC server or device 103 as illustrated in FIG. 1.

Computer device 1605 in computing environment 1600 can include one or more processing units, cores, or processors 1610, memory 1615 (e.g., RAM, ROM, and/or the like), internal storage 1620 (e.g., magnetic, optical, solid state storage, and/or organic), and/or I/O interface 1625, any of which can be coupled on a communication mechanism or bus 1630 for communicating information or embedded in the computer device 1605. I/O interface 1625 is also configured to receive images from cameras or provide images to projectors or displays, depending on the desired implementation.

Computer device 1605 can be communicatively coupled to input/user interface 1635 and output device/interface 1640. Either one or both of input/user interface 1635 and output device/interface 1640 can be a wired or wireless interface and can be detachable. Input/user interface 1635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1640 may include a display, television, monitor, printer, speaker, braille, or the like. In some example implementations, input/user interface 1635 and output device/interface 1640 can be embedded with or physically coupled to the computer device 1605. In other example implementations, other computer devices may function as or provide the functions of input/user interface 1635 and output device/interface 1640 for a computer device 1605.

Examples of computer device 1605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1605 can be communicatively coupled (e.g., via I/O interface 1625) to external storage 1645 and network 1650 for communicating with any number of networked components, devices, and systems, including one or more computer devices of the same or different configuration. Computer device 1605 or any connected computer device can be functioning as, providing services of, or referred to as a server, client, thin server, general machine, special-purpose machine, or another label.

I/O interface 1625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1600. Network 1650 can be any network or combination of networks (e.g., the Internet, local area network, wide area network, a telephonic network, a cellular network, satellite network, and the like).

Computer device 1605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1605 can be used to implement techniques, methods, applications, processes, or computer-executable instructions in some example computing environments. Computer-executable instructions can be retrieved from transitory media and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1610 can execute under any operating system (OS) (not shown), in a native or virtual environment. One or more applications can be deployed that include logic unit 1660, application programming interface (API) unit 1665, input unit 1670, output unit 1675, and inter-unit communication mechanism 1695 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1665, it may be communicated to one or more other units (e.g., logic unit 1660, input unit 1670, output unit 1675). In some instances, logic unit 1660 may be configured to control the information flow among the units and direct the services provided by API unit 1665, input unit 1670, output unit 1675, in some example implementations described above. For example, the flow of one or more processes or implementations may be controlled by logic unit 1660 alone or in conjunction with API unit 1665. The input unit 1670 may be configured to obtain input for the calculations described in the example implementations, and the output unit 1675 may be configured to provide output based on the calculations described in example implementations.

Processor(s) 1610 can be configured to execute the aspects as follows.

In a first aspect, processor(s) 1610 can execute a method or instructions from a computer readable medium that involve training each of a plurality of machine learning models for an application assigned to one or more runtime environments in which data is obtained via a cellular network, the training of the each of the plurality of machine learning models for the application conducted separately, the training involving training the each of the plurality of machine learning models selected with a plurality of data sets to form a plurality of trained machine learning models, each of the plurality of data sets associated with a different fidelity level; outputting model latency information for each of the plurality of trained machine learning models; allocating resources to the one or more runtime environments based on a Quality of Services (QoS) level assigned to the application and the model latency information associated with the each of the plurality of machine learning models; and storing the each of the plurality of trained machine learning models and associated data fidelity levels in a model catalog; wherein the data fidelity level is calculated based on a signal level and interference obtained in the application layer as illustrated in FIGS. 5 and 11. This aspect can be used to train the machine learning models.

In a second aspect, processor(s) 1610 can execute a method or instructions from a computer readable medium according to any of the above aspects, and further involve executing the application on the one or more runtime environments, the executing the application on the one or more runtime environments involving selecting a trained machine learning model from the plurality of trained machine learning models for the application based on the data fidelity level for the received data for the application; allocating the resources for execution of the application with the selected trained machine learning model based on the QoS level assigned to the application and the data fidelity level for the received data for the application; and executing the selected trained machine learning model with the allocated resources. This aspect can be utilized to operate the application as shown in FIG. 3.

In a third aspect, processor(s) 1610 can execute a method or instructions from a computer readable medium according to any of the above aspects, and further involve for the selecting of the trained machine learning model from the plurality of trained machine learning models for the application based on the data fidelity level for the received data for the application resulting in a selection of multiple ones of the plurality of trained machine learning models, generating an optimization problem configured to determine an optimized allocation of the resources to the multiple ones of the plurality of trained machine learning models for all applications that are to be operated in a given time period; solving the optimization problem to determine the optimized allocation of the resources to the multiple ones of the plurality of trained machine learning models; and wherein the allocating resources to the one or more runtime environments is conducted according to the optimized allocation as illustrated in FIG. 15. In this aspect, when the optimization problem is solved through the flow in FIG. 15, the solution will determine which models from table shown in FIG. 11 should be used. Once that is known, resource allocation is done to meet the latency requirements of these models.

In a fourth aspect, processor(s) 1610 can execute a method or instructions from a computer readable medium according to any of the above aspects, wherein the selecting the trained machine learning model from the plurality of trained machine learning models for the application based on the data fidelity level for the received data for the application involves determining a list of the all applications that are to be operated in a given time period; for each application in the list of all applications that are to be operated in the given time period, obtaining the QoS level assigned to the each application, and the current data fidelity level for the received data for the application of the one or more runtime environments; determining a corresponding one of the plurality of machine learning models associated with the each application based on the obtained data fidelity level to result in the selection of the multiple ones of the plurality of trained machine learning models; and wherein the generating the optimization problem configured to determine an optimized allocation of the resources utilizes the QoS level assigned to the each application as illustrated in FIG. 15. In this aspect, QoS level as assigned to the application is also used to determine the optimization problem as described in the equations corresponding to FIG. 15.

In a fifth aspect, processor(s) 1610 can execute a method or instructions from a computer readable medium according to any of the above aspects, wherein the selecting the trained machine learning model from the plurality of trained machine learning models for the application based on the data fidelity level for the received data for the application involves referring to the model catalog that stores the plurality of trained machine learning models to select the trained machine learning model based on the model latency information and accuracy associated with the plurality of trained machine learning models in the model catalog, wherein ones of the plurality of trained machine learning models having the accuracy not meeting a required accuracy of the application based on the data fidelity level for the received data for the application are rejected as illustrated in FIGS. 5, 11, 13 and 14. In this aspect, as an output of the process illustrated at 403 of FIG. 5, the information of FIG. 11 is obtained which provides the accuracy and latency (in FLOPs) of an algorithm. From signal 106, the required accuracy and required latency of the application is obtained and if the accuracy is less than the required accuracy, the algorithm is rejected.

In a sixth aspect, processor(s) 1610 can execute a method or instructions from a computer readable medium according to any of the above aspects, wherein the one or more runtime environments are one or more of a virtual machine or a container as described herein.

In a seventh aspect, processor(s) 1610 can execute a method or instructions from a computer readable medium according to any of the above aspects, wherein the resources involve compute resources and storage resources associated with the one or more runtime environments as described herein.

In an eighth aspect, processor(s) 1610 can execute a method or instructions from a computer readable medium according to any of the above aspects, wherein the allocating the resources to the one or more runtime environments based on the Quality of Services (QoS) level assigned to the application and the data fidelity level associated with the each of the plurality of machine learning models involves obtaining application level QoS latency information assigned to the application; obtaining a number of floating point operations per second per machine learning model event of the each of the plurality of machine learning models; determining a service latency that meets the QoS level assigned to the application based on the application level QoS latency information; and calculating the resources to be allocated based on the number of floating point operations per machine learning model event and the application level QoS latency information as illustrated in FIG. 12. In this aspect, depending on the desired implementation, the model latency information (F), Service latency (L2) and application level QoS latency information (L1) can be used in accordance with the equations as described in FIG. 12.

In a ninth aspect, processor(s) 1610 can execute a method or instructions from a computer readable medium according to any of the above aspects, and further involve partitioning data over a plurality of data fidelity levels for training the plurality of machine learning models; wherein the training the each of the plurality of machine learning models involves training the each of the plurality of machine learning models with the partitioned data having a same data fidelity level as the data fidelity level associated with the each of the plurality of machine learning models as illustrated in FIGS. 5 and 7.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
training each of a plurality of machine learning models for an application assigned to one or more runtime environments in which data is obtained via a cellular network, the training of the each of the plurality of machine learning models for the application conducted separately, the training comprising:
training the each of the plurality of machine learning models selected with a plurality of data sets to form a plurality of trained machine learning models, each of the plurality of data sets associated with a different fidelity level;
outputting model latency information for each of the plurality of trained machine learning models;
allocating resources to the one or more runtime environments based on a Quality of Services (QoS) level assigned to the application and the model latency information associated with the each of the plurality of machine learning models; and
storing the each of the plurality of trained machine learning models and associated data fidelity levels in a model catalog;
wherein the data fidelity level is calculated based on a signal level and interference obtained in the application layer, and
wherein the allocating the resources to the one or more runtime environments based on the QoS level assigned to the application and the data fidelity level associated with the each of the plurality of machine learning models comprises:
obtaining application level QoS latency information assigned to the application;
obtaining a number of floating point operations per second per machine learning model event of the each of the plurality of machine learning models;
determining a service latency that meets the QoS level assigned to the application based on the application level QoS latency information; and
calculating the resources to be allocated based on the number of floating point operations per machine learning model event during execution of the each of the machine learning models and the application level QoS latency information.

2. The method of claim 1, further comprising:
executing the application on the one or more runtime environments, the executing the application on the one or more runtime environments comprising:
selecting a trained machine learning model from the plurality of trained machine learning models for the application based on the data fidelity level for the received data for the application;
allocating the resources for execution of the application with the selected trained machine learning model based on the QoS level assigned to the application and the data fidelity level for the received data for the application; and
executing the selected trained machine learning model with the allocated resources.

3. The method of claim 2, further comprising, for the selecting of the trained machine learning model from the plurality of trained machine learning models for the application based on the data fidelity level for the received data for the application resulting in a selection of multiple ones of the plurality of trained machine learning models:
generating an optimization problem configured to determine an optimized allocation of the resources to the multiple ones of the plurality of trained machine learning models for all applications that are to be operated in a given time period;
solving the optimization problem to determine the optimized allocation of the resources to the multiple ones of the plurality of trained machine learning models; and
wherein the allocating resources to the one or more runtime environments is conducted according to the optimized allocation.

4. The method of claim 3, wherein the selecting the trained machine learning model from the plurality of trained machine learning models for the application based on the data fidelity level for the received data for the application comprises:
determining a list of the all applications that are to be operated in a given time period;
for each application in the list of all applications that are to be operated in the given time period:
obtaining the QoS level assigned to the each application, and the current data fidelity level for the received data for the application of the one or more runtime environments;
determining a corresponding one of the plurality of machine learning models associated with the each application based on the obtained data fidelity level to result in the selection of the multiple ones of the plurality of trained machine learning models; and
wherein the generating the optimization problem configured to determine an optimized allocation of the resources utilizes the QoS level assigned to the each application.

5. The method of claim 2, wherein the selecting the trained machine learning model from the plurality of trained machine learning models for the application based on the data fidelity level for the received data for the application comprises referring to the model catalog that stores the plurality of trained machine learning models to select the trained machine learning model based on the model latency information and accuracy associated with the plurality of trained machine learning models in the model catalog, wherein ones of the plurality of trained machine learning models having the accuracy not meeting a required accuracy of the application based on the data fidelity level for the received data for the application are rejected.

6. The method of claim 1, wherein the one or more runtime environments are one or more of a virtual machine or a container.

7. The method of claim 1, wherein the resources comprises compute resources and storage resources associated with the one or more runtime environments.

8. The method of claim 1, further comprising:
partitioning data over a plurality of data fidelity levels for training the plurality of machine learning models;

wherein the training the each of the plurality of machine learning models comprises training the each of the plurality of machine learning models with the partitioned data having a same data fidelity level as the data fidelity level associated with the each of the plurality of machine learning models.

9. A non-transitory computer readable medium, storing instructions for executing a process by one or more processors, the instructions comprising:
    training each of a plurality of machine learning models for an application assigned to one or more runtime environments in which data is obtained via a cellular network, the training of the each of the plurality of machine learning models for the application conducted separately, the training comprising:
        training the each of the plurality of machine learning models selected with a plurality of data sets to form a plurality of trained machine learning models, each of the plurality of data sets associated with a different fidelity level;
        outputting model latency information for each of the plurality of trained machine learning models;
        allocating resources to the one or more runtime environments based on a Quality of Services (QOS) level assigned to the application and the model latency information associated with the each of the plurality of machine learning models; and
        storing the each of the plurality of trained machine learning models and associated data fidelity levels in a model catalog;
    wherein the data fidelity level is calculated based on a signal level and interference obtained in the application layer, and
    wherein the allocating the resources to the one or more runtime environments based on the QoS level assigned to the application and the data fidelity level associated with the each of the plurality of machine learning models comprises:
        obtaining application level QoS latency information assigned to the application;
        obtaining a number of floating point operations per second per machine learning model event of the each of the plurality of machine learning models;
        determining a service latency that meets the QoS level assigned to the application based on the application level QoS latency information; and
        calculating the resources to be allocated based on the number of floating point operations per machine learning model event during execution of the each of the machine learning models and the application level QoS latency information.

10. The non-transitory computer readable medium of claim 9, the instructions further comprising:
    executing the application on the one or more runtime environments, the executing the application on the one or more runtime environments comprising:
        selecting a trained machine learning model from the plurality of trained machine learning models for the application based on the data fidelity level for the received data for the application;
        allocating the resources for execution of the application with the selected trained machine learning model based on the QoS level assigned to the application and the data fidelity level for the received data for the application; and
        executing the selected trained machine learning model with the allocated resources.

11. The non-transitory computer readable medium of claim 10, the instructions further comprising, for the selecting of the trained machine learning model from the plurality of trained machine learning models for the application based on the data fidelity level for the received data for the application resulting in a selection of multiple ones of the plurality of trained machine learning models:
    generating an optimization problem configured to determine an optimized allocation of the resources to the multiple ones of the plurality of trained machine learning models for all applications that are to be operated in a given time period;
    solving the optimization problem to determine the optimized allocation of the resources to the multiple ones of the plurality of trained machine learning models; and
    wherein the allocating resources to the one or more runtime environments is conducted according to the optimized allocation.

12. The non-transitory computer readable medium of claim 11, wherein the selecting the trained machine learning model from the plurality of trained machine learning models for the application based on the data fidelity level for the received data for the application comprises:
    determining a list of the all applications that are to be operated in a given time period;
        for each application in the list of all applications that are to be operated in the given time period:
            obtaining the QoS level assigned to the each application, and the current data fidelity level for the received data for the application of the one or more runtime environments;
            determining a corresponding one of the plurality of machine learning models associated with the each application based on the obtained data fidelity level to result in the selection of the multiple ones of the plurality of trained machine learning models; and
    wherein the generating the optimization problem configured to determine an optimized allocation of the resources utilizes the QoS level assigned to the each application.

13. The non-transitory computer readable medium of claim 10, wherein the selecting the trained machine learning model from the plurality of trained machine learning models for the application based on the data fidelity level for the received data for the application comprises referring to the model catalog that stores the plurality of trained machine learning models to select the trained machine learning model based on the model latency information and accuracy associated with the plurality of trained machine learning models in the model catalog, wherein ones of the plurality of trained machine learning models having the accuracy not meeting a required accuracy of the application based on the data fidelity level for the received data for the application are rejected.

14. The non-transitory computer readable medium of claim 9, wherein the one or more runtime environments are one or more of a virtual machine or a container.

15. The non-transitory computer readable medium of claim 9, wherein the resources comprises compute resources and storage resources associated with the one or more runtime environments.

16. The non-transitory computer readable medium of claim 9, further comprising:
    partitioning data over a plurality of data fidelity levels for training the plurality of machine learning models;

wherein the training the each of the plurality of machine learning models comprises training the each of the plurality of machine learning models with the partitioned data having a same data fidelity level as the data fidelity level associated with the each of the plurality of machine learning models.

17. An apparatus, comprising:
a processor configured to:
   train each of a plurality of machine learning models for an application assigned to one or more runtime environments in which data is obtained via a cellular network, the training of the each of the plurality of machine learning models for the application conducted separately, by:
      training the each of the plurality of machine learning models selected with a plurality of data sets to form a plurality of trained machine learning models, each of the plurality of data sets associated with a different fidelity level;
      outputting model latency information for each of the plurality of trained machine learning models;
      allocating resources to the one or more runtime environments based on a Quality of Services (QoS) level assigned to the application and the model latency information associated with the each of the plurality of machine learning models; and
      storing the each of the plurality of trained machine learning models and associated data fidelity levels in a model catalog;
   wherein the data fidelity level is calculated based on a signal level and interference obtained in the application layer, and
   wherein the allocating the resources to the one or more runtime environments based on the QoS level assigned to the application and the data fidelity level associated with the each of the plurality of machine learning models comprises:
      obtaining application level QoS latency information assigned to the application;
      obtaining a number of floating point operations per second per machine learning model event of the each of the plurality of machine learning models;
      determining a service latency that meets the QoS level assigned to the application based on the application level QoS latency information; and
      calculating the resources to be allocated based on the number of floating point operations per machine learning model event during execution of the each of the machine learning models and the application level QoS latency information.

* * * * *